United States Patent [19]

Felder

[11] Patent Number: 4,776,742
[45] Date of Patent: Oct. 11, 1988

[54] APPARATUS FOR EMPTYING CONTAINERS

[75] Inventor: Hans C. Felder, Dreieichenhain, Fed. Rep. of Germany

[73] Assignee: Gebhardt Fördertechnik GmbH, Sinsheim, Fed. Rep. of Germany

[21] Appl. No.: 758,371

[22] Filed: Jul. 24, 1985

Related U.S. Application Data

[63] Continuation of Ser. No. 435,334, Oct. 19, 1982, abandoned.

[30] Foreign Application Priority Data

Oct. 20, 1981 [DE] Fed. Rep. of Germany ....... 3141514

[51] Int. Cl.⁴ .......................................... B65G 59/02
[52] U.S. Cl. .................................... 414/118; 414/417
[58] Field of Search ............... 414/417, 418, 118, 119, 414/98, 120

[56] References Cited

U.S. PATENT DOCUMENTS

| | | | |
|---|---|---|---|
| 3,426,922 | 2/1969 | Massey | 414/417 X |
| 3,578,184 | 5/1971 | Schaich | 414/417 X |
| 3,616,951 | 11/1971 | St. Clari et al. | 414/118 X |
| 3,776,395 | 12/1973 | Lingg et al. | 414/417 X |
| 3,890,185 | 6/1975 | Umazume | 414/120 X |
| 3,948,401 | 4/1976 | Spencer | 414/417 X |
| 4,005,792 | 2/1977 | Schulman et al. | 414/417 X |
| 4,104,846 | 8/1978 | Waller | 414/98 X |
| 4,105,150 | 8/1978 | Insolio | 414/98 X |
| 4,106,635 | 8/1978 | Nishimura | 414/118 |
| 4,273,496 | 6/1981 | Papalexis | 414/417 |

FOREIGN PATENT DOCUMENTS

| | | | |
|---|---|---|---|
| 1116599 | 11/1961 | Fed. Rep. of Germany | 414/118 |
| 1481354 | 1/1969 | Fed. Rep. of Germany | 414/118 |
| 2010507 | 9/1970 | Fed. Rep. of Germany | 414/420 |
| 800072 | 1/1981 | U.S.S.R. | 414/118 |

Primary Examiner—Leslie J. Paperner
Assistant Examiner—David A. Bucci
Attorney, Agent, or Firm—Barnes & Thornburg

[57] ABSTRACT

An apparatus for emptying containers which are loaded with pedominantly horizontal, preferably flat piece goods and which are transported on a conveyor to the discharge location; for purposes of emptying the containers, the piece goods are tilted in the discharge direction and are lifted so that they can slide off in the discharge direction, one after the other; a column of piece goods is produced whose coding can be mechanically read rapidly and correctly by a conventional reading device so that they can be coordinated to a predetermined destination.

10 Claims, 3 Drawing Sheets

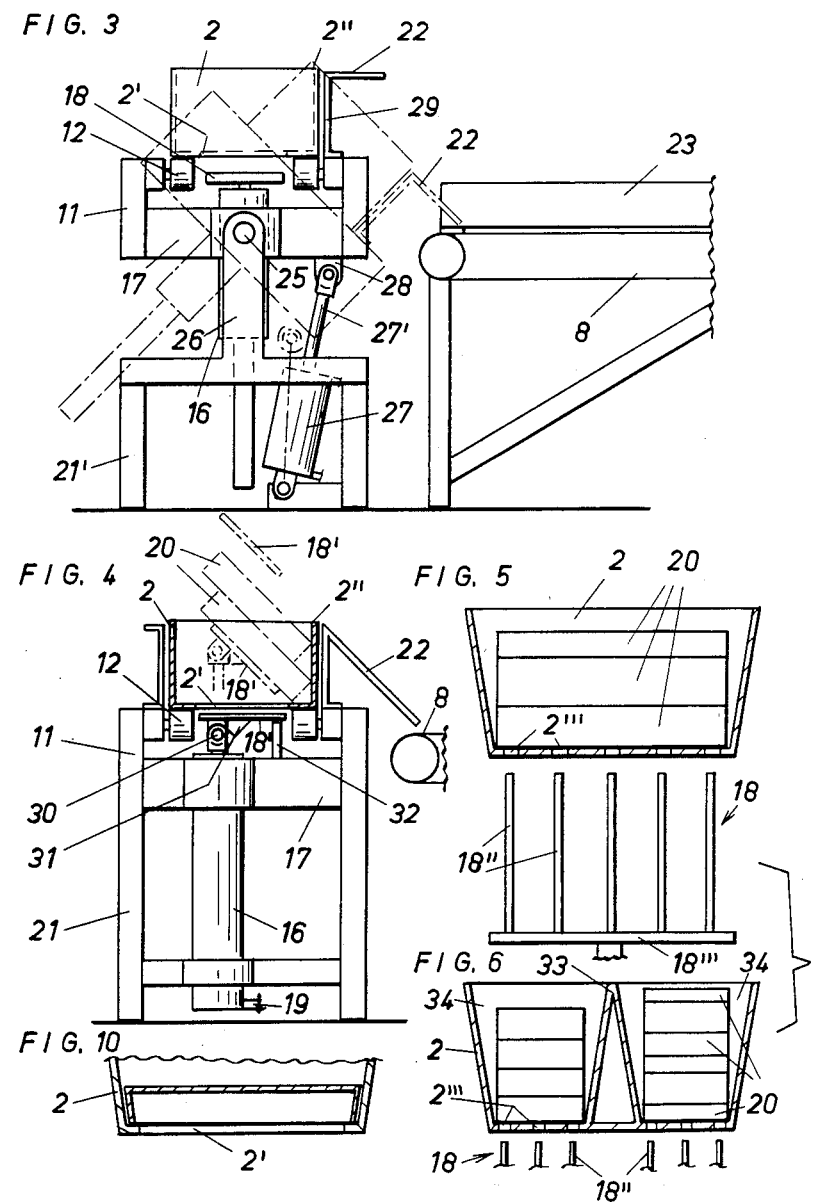

APPARATUS FOR EMPTYING CONTAINERS

This is a continuation of application Ser. No. 435,334, filed Oct. 19, 1982, now abandoned.

The present invention relates to an apparatus for emptying containers loaded up with preferably flat parcels or piece goods disposed one above the other, which are conveyed on a conveyor track to the emptying place.

Apparatus for emptying containers are known already, in which the container is tilted over by a tilting mechanism so that the content drops on a platform or on a conveyor device in a disorderly manner. The piece goods then lie adjacent one another and/or one on top of each other in a disorderly manner as well as randomly with their top or bottom surface facing upwardly. The piece goods then have to be separated out, orderd, controlled and coordinated to a predetermined destination. Apart from a possible erroneous reading, this method of assorting requires the intensive use of personnel, which additionally is uneconomical with irregular piece goods.

It is therefore the object of the present invention to mechanize the emptying of containers and the coordination of the discharged piece goods to a predetermined destination.

The underlying problems are solved by the present invention in that the piece goods stacked in the container is inclined in the emptying direction and is lifted by a lifting mechanism over the edge of the container so that it slides off in the emptying direction.

The advantages attainable with the present invention reside especially in that the piece goods slide off one after the other by the tilting and the lifting in the container, i.e., form a column of individual piece goods which can be easily ordered and can also be mechanically read and assorted since always the same side faces up. The piece goods can thus be placed randomly into a container and always arrivee safely at the coordinated destination. The apparatus for emptying containers can thus be used for a large number of different types of piece goods in order to guide the same to a predetermined destination.

Further objects, features and advantages of the present invention will become more apparent from the following description when taken in connection with the accompanying drawing which shows, for purposes of illustration only, several embodiments in accordance with the present invention, and wherein:

FIG. 3 is a front elevational view of another embodiment of an emptying apparatus in accordance with the present invention;

FIG. 4 is a front elevational view of a further embodiment of an emptying apparatus in accordance with the present invention;

FIG. 5 is a cross-sectional view through the container and an elevational view of a plunger used with the apparatus in accordance with the present invention;

FIG. 6 is a cross-sectional view through a modified construction of a container;

FIG. 10 is a partial cross-sectional view through a still further modified embodiment of a container for use with the emptying apparatus in accordance with the present invention.

Figure 1:
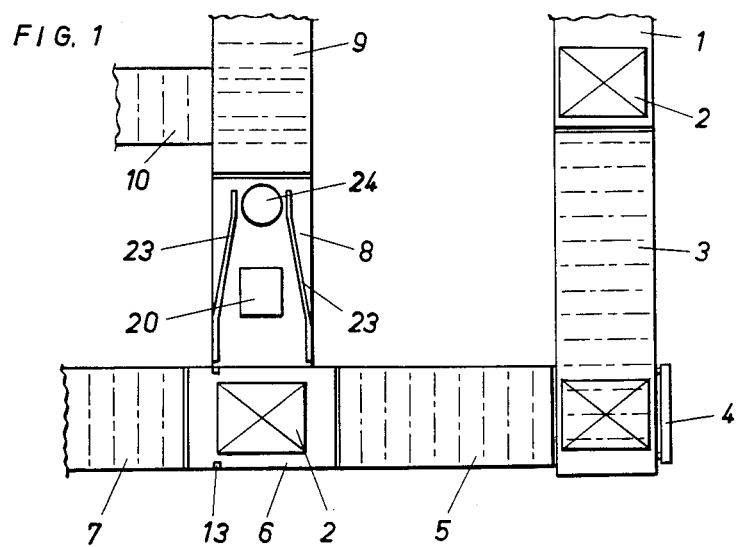
FIG. 1 is a plan view on a conveyor system equipped with an emptying apparatus in accordance with the present invention.

The apparatus for emptying containers according to FIG. 1 is built into a conveyor system in which the loaded containers 2 are supplied on a feed conveyor 1. A nondriven roller conveyor 3 adjoins the feed conveyor 1; a cross conveyor 4 with adjoining roller conveyor 5 is disposed transversely at the end of the nondriven roller conveyor 3. The roller conveyor 5 terminates in the emptying apparatus 6. An emptying container conveyor 7 is connected to the emptying apparatus 6 in the conveying direction of the roller conveyor 5 whereas a goods' conveyor 8 is provided in the emptying direction which is adjoined by a conveyor 9 with delivery stations 10. Of course, the conveyor system may also be constructed in any other suitable manner.

Figure 2:
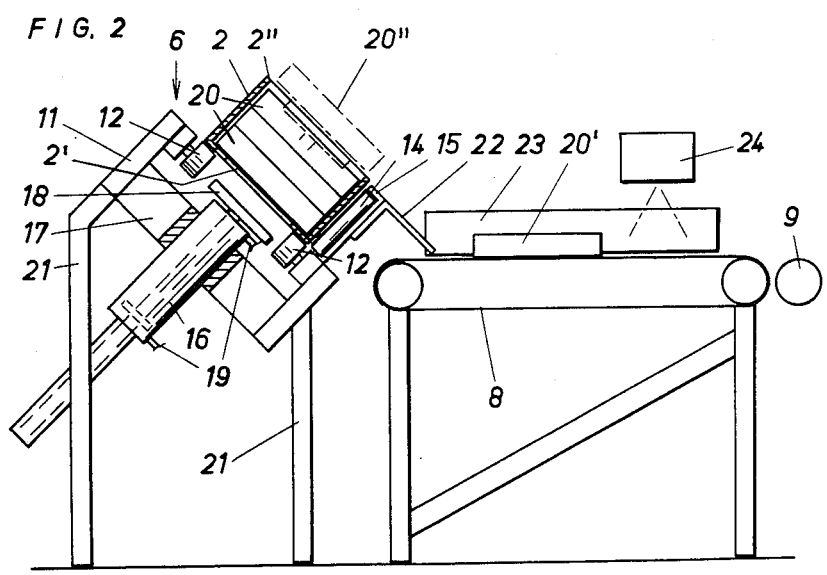
FIG. 2 is a front elevational view of one embodiment of the emptying apparatus of the present invention.

In the embodiment of FIG. 2, the roller conveyor 5 which is initially arranged horizontally in the usual manner, passes over continuously into a position inclined toward the discharge direction to the goods' conveyor 8 in order to adjoin the discharge apparatus generally designated by reference numeral 6 in the same inclined position. The discharge apparatus 6 includes a frame 11 inclined by about 45° in which is supported a conveyor 12 consisting of rollers for the purpose of conveying or transporting the containers; the conveyor 12 is driven in a conventional manner (not shown). As soon as the containers 2 reach the discharge location, the conveyance is stopped by interruption of a light barrier 13 or of a corresponding positioning device (FIG. 1). Rollers 14 installed in the side wall plane prevent the sliding off of the container 2 in the inclined direction; the rollers 14 are rotatably supported in a support 15 mounted on the frame 11. Centrally below the container standing at the discharge location, an operating cylinder 16 actuated by an auxiliary force is provided at a web 17 secured at the frame 11, whose piston rod carries a plunger or piston 18. The pressure medium is conducted to and from the cylinder 16 through lines 19 so that the plunger 18 can be displaced upwardly or downwardly. The bottom of the containr 2 disposed above the plunger 18 is provided with an aperture 2', through which the plunger is able to enter the container 2 and lift the piece goods 20 stored therein. The frame 11 of the emptying apparatus rests on a support frame 21 so that a slide 22 secured at the support 15 slightly below the upper edge 2" of the container 2 terminates closely above the goods' conveyor 8. The centering device 23 on the goods' conveyor 8 assures the centered arrangement of the discharged piece goods 20' so that they slide through underneath a reader 24. All piece goods 20 can be used have a flat sliding surface and which are preferably adapted to be stacked one above the other. i.e., which are constructed or packed parcel- or packaged-shaped.

It can be seen that a container 2 reaching the roller conveyor 5 from the feed conveyor 1 is brought into the inclined position on the roller conveyor 5 and thus slides onto the conveyor 12 of the discharge apparatus 6. In the emptying position, the drive of the conveyor 12 is turned off by the light barrier 13 and the plunger 18 is extended upwardly by supply of pressure medium to the operating cylinder 16. The plunger 18 passes through the aperture 2' in the bottom of the container 2 and forces the piece goods 20 stored therein upwardly. As soon as the upper piece goods 20" have surpassed the upper edge 2' of the container 2, it slides in the discharge direction downwardly onto the goods' conveyor 8 by way of the slide 22. On the latter, the piece goods 20' are centered by the centering device 23 so that they pass through underneath the reading device 24 whereby the coding applied to the top side is mechanically read so that the piece goods 20' are removed from the conveyor 9 at the coordinated removal station 10 in order to be conducted to a shipment to be compiled, to an assortment storage or the like. After the emptying of the container 2, i.e., when the plunger 18 has reached its upper end position illustrated in dash and dotted lines, the plunger 18 is returned to its original position, the conveyor 12 is turned on, and thus the container 2 is transferred onto the empty container conveyor 7, on which it reaches again the loading station.

In the embodiment of FIG. 3, the frame 11 is pivotally supported in the discharge direction on a central shaft 25 at a support 26 secured on the frame 21'. In the conveying position illustrated in full line, the plane of the conveyor 12 is horizontal and coincides with the roller conveyor 5 also constructed in a horizontal plane so that a container 2 can be transferred from the roller conveyor 5 onto the conveyor 12. An operating cylinder 27 serves for the pivoting about the shaft 25, which is pivotally secured at the support frame 21 and whose piston rod 27' is pivotally supported at a lug 28 of the frame 11 so that is is pivotal from the conveying position in the clockwise direction into the discharge position indicated in dash and dotted lines, in which the slide 22 points toward the goods' conveyor 8. The operating cylinder 16 for the plunger or piston 18 is supported in the mounting support 26 and partakes in the pivot movements thereof.

The operation corresponds to that described hereinabove. If the continer 2 has reached its emptying or discharge position, the conveyor is stopped and the frame 11 is pivoted by means of the operating cylinder 27 in the clockwise direction into the discharge position illustrated in dash-and-dotted lines, in which the piece goods 20 slide piecewise by the upwardly pressing plunger 18 onto the goods' conveyor 8 by way of the slide 22. In the emptying position, the container 2 is supported at an abutment wall 29 secured on the frame 11 and carrying the slide 22. If the plunger 18 has reached its upper end position, it and the frame 11 return to the starting position and the drive of the conveyor 12 is again turned on so that the emptied container 2 reaches the empty container conveyor 7 and is transported on the same back to a loading station.

In the embodiment of FIG. 4, the conveyor 12 is supported fixed in a horizontal plane and the plunger 18' together with its operating cylinder 16 is supported correspondingly vertically. The plunger 18' is pivtally connected on a shaft 30 eccentrically at the piston rod of the operating cylinder 16 so that it can carry out a pivot movement in the clockwise direction, and more particularly, until it hits a stop 31 on a counter abutment at the piston rod, as indicated in the raised position in dash-and-dotted lines. The plunger 18' is kept in the normal position closely below the container 2 to be emptied in the horizontal position by an abutment 32 fixed at the frame.

If the container 2 has assumed its discharge position, then the piston rod of the operating cylinder 16 moves in the upward direction so that the plunger 18' contacts essentially the bottom of the lowermost piece goods 20 resting in the container 2 and rotates the same by reason of the eccentric force engagement in the discharge direction, in the illustrated embodiment, in the clockwise direction, and then forces the same upwardly. If the plunger 18' has reached its pivoted end position, the piece goods 20 or the stacked goods 20 are displayed upwardly parallely to each other until they slide individually and successively over the upper edge 2" and the slide 22 onto the goods' conveyor 8. Of course, the plunger 18' may also be constructed rigidly with an inclined pressure surface contacting the bottom of the piece goods 20.

The plunger 18 may be constructed as flat, one-piece plate as illustrated in FIGS. 2 to 4, to which is coordinated a corresponding aperture 2' in the bottom of the container 2. However, the plunger 18 may also consist of several partial plungers 18" which are constructed as individual rods or webs, as illustrated in FIGS. 5 and 6. These partial plungers 18" are mounted on a plunger plate 18"' so that they can be moved up and down in the described manner whereby they penetrate through apertures 2"' in the bottom of the container 2 which are arranged correspondingly in shape and number to the number of the partial plungers, and thereby lift the piece goods disposed therein. The upper common plane of these partial plungers 18" may be constructed horizontally, i.e., parallely to the bottom of the container 2 or may also be constructed inclined in order to bring the piece goods 20 directly into the inclined position in the manner described hereinabove.

The container 2 may be undivided on the inside, i.e., may have a single space in which is placed a correspondingly large package 20. However, it may also be subdivided into compartments 34 by partition walls 33 (FIG. 6), in which is then disposed the correspondingly smaller package 20. The partition wall 33 may be non-detachably secured in the container 2; however, it may also represent a loose part which may be inserted in case of need into the container, preferably form-lockingly, for example, by being plugged in. The apertures 2"' in the bottom of the container 2 are arranged as groups coordinated to the compartments 34, to which are coordinated partial plungers 18" arranged correspondingly groupwise. Appropriately, the groups of the partial plungers 18" are constructed in a similar manner so that each group of partial plungers 18" can be introduced into each group of apertures 2"' alone or at the same time with others.

Figure 7:
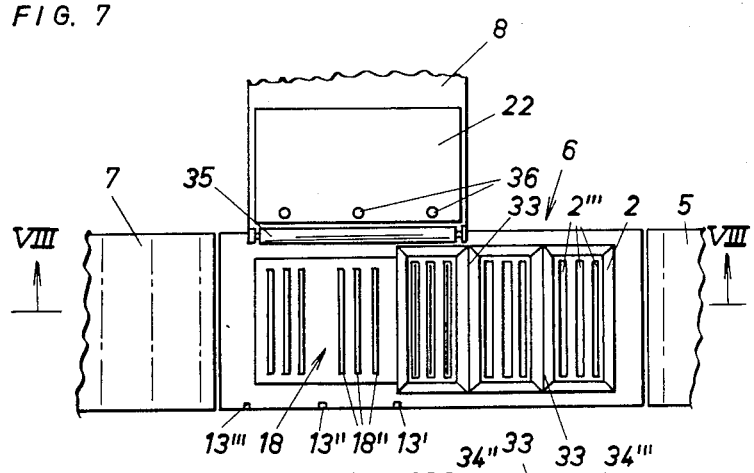
FIG. 7 is a plan view on a still further embodiment of an emptying apparatus in accordance with the present invention.
Figure 8:
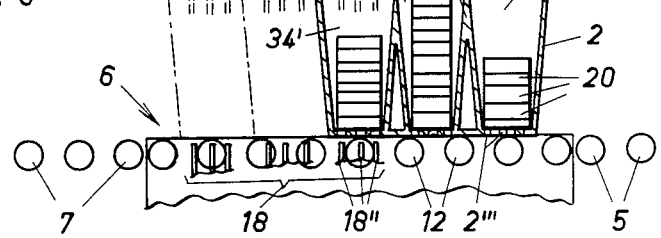
FIG. 8 is a cross-sectional view, taken along line VIII-VIII of FIG. 7.

Since always only a single piece good 20 should be discharged in order to enable the reaching and coordination in the series-connected goods' conveyor 8, the following emptying operation will result according to FIGS. 7 and 8. The container 2 is conveyd by way of the roller conveyor 5 onto the conveyor 12 of the emptying apparatus 6. As soon as the first light barrier 13' of the positioning device 13 is interrupted, the conveyance is stopped. The container has then reached the first emptying position in which the first compartment 34' is discharged or emptied. For that purpose, the plunger 18 moves upwardly, whereby the first group of partial plungers 18" enters the apertures 2"' of the first compartment 34' and raises the piece goods 20 disposed therein whereas the two other groups of partial plungers 18" move upwardly empty outside the container 2.

With the beginning of the emptying operation, a conveyor roller 35 is turned on, which is so arranged ahead of the slide 22 that the sliding off package 20 is supported thereon after a short travel. since the conveyor roller 35 is set into rotation by a drive (not shown), the package 20 is conveyed accelerated onto the slide 22. As a result thereof, the emptying is shortened. A light barrier 36 or the like is connected directly behind the conveyor roller 35, over which the piece goods slide. As soon as the light barrier 36 is covered, the feed of the plunger 18 is interrupted, and more particularly for such length of time as the light barrier 36 is covered by the parcel 20 or time-controlled separately. It is assured therewith that the piece goods 20 are discharged individually or behind the other. The respective stoppage of the package 20 by a light barrier 13 is preprogrammed by the detection of the respectively present partition wall 33.

If the plunger 18 has reached its upper end position indicated in dash-and-dotted lines, it is again lowered into its starting position and the drive of the conveyor 12 is turned on. The container 2 moves toward the left in the conveyance direction until it has reached the second light barrier 13" and is stopped again. It is now in the second emptying position, and the emptying cycle described hereinabove commences anew, whereby the first and second group of partial plungers 18" enter the apertures 2''' of the first compartment 34' and of the second compartment 34". The second compartment 34" is now discharged. After renewed lowering of the plunger 18 into its starting position, the container moves into its third emptying position at the location of the third light barrier 13'''. All groups of partial plungers 18" now enter into the apertures 2''' of all compartments 34', 34" and 34''' whereby the third compartment 34''' is discharged. After termination of the last emptying operation, the container 2 is conveyd onto the empty container conveyor 7 whereas the next loaded container 2 is conducted to the emptying apparatus 6.

Figure 9:
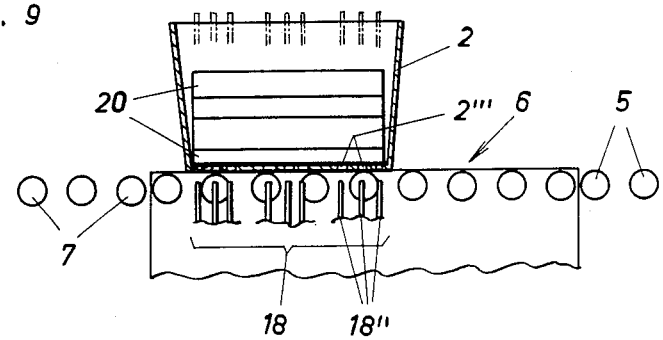
FIG. 9 is a cross-sectional view, similar to FIG. 8, illustrating a modified container in accordance with the present invention.

If the container 2 does not have any partition walls 33, i.e., has a single space and, according to FIG. 9 is loaded correspondingly with a large piece 20, then the container 2 is stopped only by the third light barrier 13'''. Since the apertures 2''' in the bottom of the container 2 are arranged groupwise corresponding to the partial plungers 18" all partial plungers 18" enter simultaneously into the container 2 and lift the package 20 in the described manner. It can be seen that with the same construction of the plunger 18, containers 2 with or without partition wall 33, i.e., large and small piece goods 20 can be discharged, whereby the compartments 34 can also be of different size, if, for example, the compartments 34' and 34" form together a compartment from which the compartment 34''' is separated off by a partition wall 33. Of course, the number of the compartments 34 can be matched to the operating conditions.

The bottom of the container 2 may, according to FIG. 10, also be constructed as loosely inserted bordered plate whose edge serves as guidance and prevents the sliding off when the bottom plane passes over the edge 2" of the container 2. However, a detachable connection of plunger 18 and bottom of the container 2, for example, by means of pins or magnets is also feasible within the scope of the present invention in order to prevent the lateral sliding off together with the piece goods 20.

While I have shown and described several embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An apparatus for emptying a container positioned on a conveyor, the container having a side means and a bottom with at least one aperture therein, the side means having a top edge, the container being loaded with piece goods which have a bottom surface and a top surface and which are inclined in a discharged direction, said piece goods being stacked serially one on top of another with their bottom surfaces facing downwardly;
    lifting means engaging only a bottom surface of a piece good at the bottom of the stack for lifting the stacked piece goods and raising the stacked goods so that a piece good on the top of the stack rises above said top edge;
    said lifting means including a plunger means external to and extending through said aperture in the bottom of said container from below the container, and wherein
    said plunger acting on the lowermost piece good of the stack lifts the stack to a height where the bottom surface of the topmost piece good in the stack clears the top edge; wherein the topmost piece good slides on its bottom surface over the edge toward the discharge positon due to its inclined position.

2. An apparatus according to claim 1 characterized in that the conveyor is arranged inclined in the discharge direction.

3. An apparatus according to claim 1, characterized in that the surface of the plunger means is inclined.

4. An apparatus according to claim 1, further comprising:
    several apertures in the bottom of said container and the plunger means includes partial plungers coordinated to the apertures and mounted on a plunger plate for engaging only the bottom surface of the bottom piece of the piece goods.

5. An apparatus according to claim 4, characterized in that the apertures are constructed admitting the partial plunger means in the second direction and the apertures being arranged parallel to one another and the partial plungers are constructed as webs disposed adjacent one another on the plunger plate.

6. An apparatus according to claim 1, characterized in that a positioning means is provided along the conveyor at the discharge location which stops the container in the respective emptying position.

7. The apparatus of claim 1 wherein the bottom surface of the piece goods are substantially flat so as to provide full support for the piece goods in the container and wherein said discharge is obtained by sliding of said piece goods over the top edge of the container.

8. The apparatus of claim 1 wherein each container has a plurality of stacks of piece goods and wherein the piece goods in each stack can be unloaded without respect to the unloading of other stacks.

9. The apparatus of claim 4 wherein each container has a plurality of stacks of piece goods and wherein the piece goods in each stack can be unloaded without respect to the unloading of other stacks.

10. The apparatus of claim 5 wherein each container has a plurality of stacks of piece goods and wherein the piece goods in each stack can be unloaded without rspect to the unloading of other stacks.

* * * * *

UNITED STATES PATENT AND TRADEMARK OFFICE
CERTIFICATE OF CORRECTION

PATENT NO.   :   4,776,742
DATED        :   October 11, 1988
INVENTOR(S)  :   Hans C. Felder It is certified that error appears in the above-identified patent and that said Letters Patent is hereby corrected as shown below:

In the ABSTRACT, line 2, "pedominantly" should read

-- predominantly --.

Column 1, line 19, "orderd" should read -- ordered --;

line 41, "arrivee" should read -- arrive --.

Column 2, line 51, "containr" should read -- container --.

Column 3, line 36, "is" (first occurrence) should read -- it --;

line 44, "continer" should read -- container --;

line 62, "pivtally" should read -- pivotally --.

Column 5, line 40, "conveyd" should read -- conveyed --.

Signed and Sealed this

First Day of August, 1989

*Attest:*

DONALD J. QUIGG

*Attesting Officer*       *Commissioner of Patents and Trademarks*